United States Patent [19]
Parsons et al.

[11] 3,801,219
[45] Apr. 2, 1974

[54] CONTROLLABLE PITCH MARIPROPELLER

[75] Inventors: John T. Parsons; Donald E. Goodland, both of Traverse City, Mich.

[73] Assignee: Jerome A. Gross, St. Louis, Mo.

[22] Filed: May 5, 1971

[21] Appl. No.: 140,435

[52] U.S. Cl. .............................. 416/157, 416/160
[51] Int. Cl. .............................................. B63h 3/08
[58] Field of Search ............ 416/155, 156, 157, 160, 416/90 A, 205, 244, 166, 165, 146, 174

[56] References Cited
UNITED STATES PATENTS

| | | | |
|---|---|---|---|
| 2,283,128 | 5/1942 | Ring | 416/174 X |
| 1,828,303 | 10/1931 | Turnbull | 416/155 |
| 3,245,497 | 4/1966 | Yokoi | 416/174 X |
| 3,406,759 | 10/1968 | Nutku | 416/160 X |
| 1,810,159 | 6/1931 | Carol | 416/155 |
| 1,894,047 | 1/1933 | Lilley | 416/157 X |
| 3,575,526 | 4/1971 | Van Gunsteren | 416/90 X |
| 2,629,451 | 2/1953 | Nichols | 416/155 |

FOREIGN PATENTS OR APPLICATIONS

| | | | |
|---|---|---|---|
| 476,710 | 9/1951 | Canada | 416/160 |
| 502,627 | 2/1920 | France | 416/160 |
| 971,355 | 7/1950 | France | 416/160 |
| 52 | 0/1907 | Great Britain | 416/160 |
| 132,321 | 7/1951 | Sweden | 416/160 |
| 969,611 | 5/1950 | France | 416/157 |
| 707,983 | 7/1941 | Germany | 416/155 |
| 485,878 | 5/1938 | Great Britain | 416/155 |
| 345,374 | 12/1936 | Italy | 416/155 |

OTHER PUBLICATIONS
French 2nd Addition Patent No. 58,648; Oct. 1953.

Primary Examiner—Everette A. Powell, Jr.
Attorney, Agent, or Firm—Jermone A. Gross

[57] ABSTRACT

A hub for a controllable pitch marine propeller has a one-piece casting mounting the blade spindles, irreversible pitch controllable mechanism, and a rotary motor control and gear reducer. Although low in weight and small in overall size, exceptionally precise control over blade angles is maintained and wear is minimized.

3 Claims, 4 Drawing Figures

3,801,219
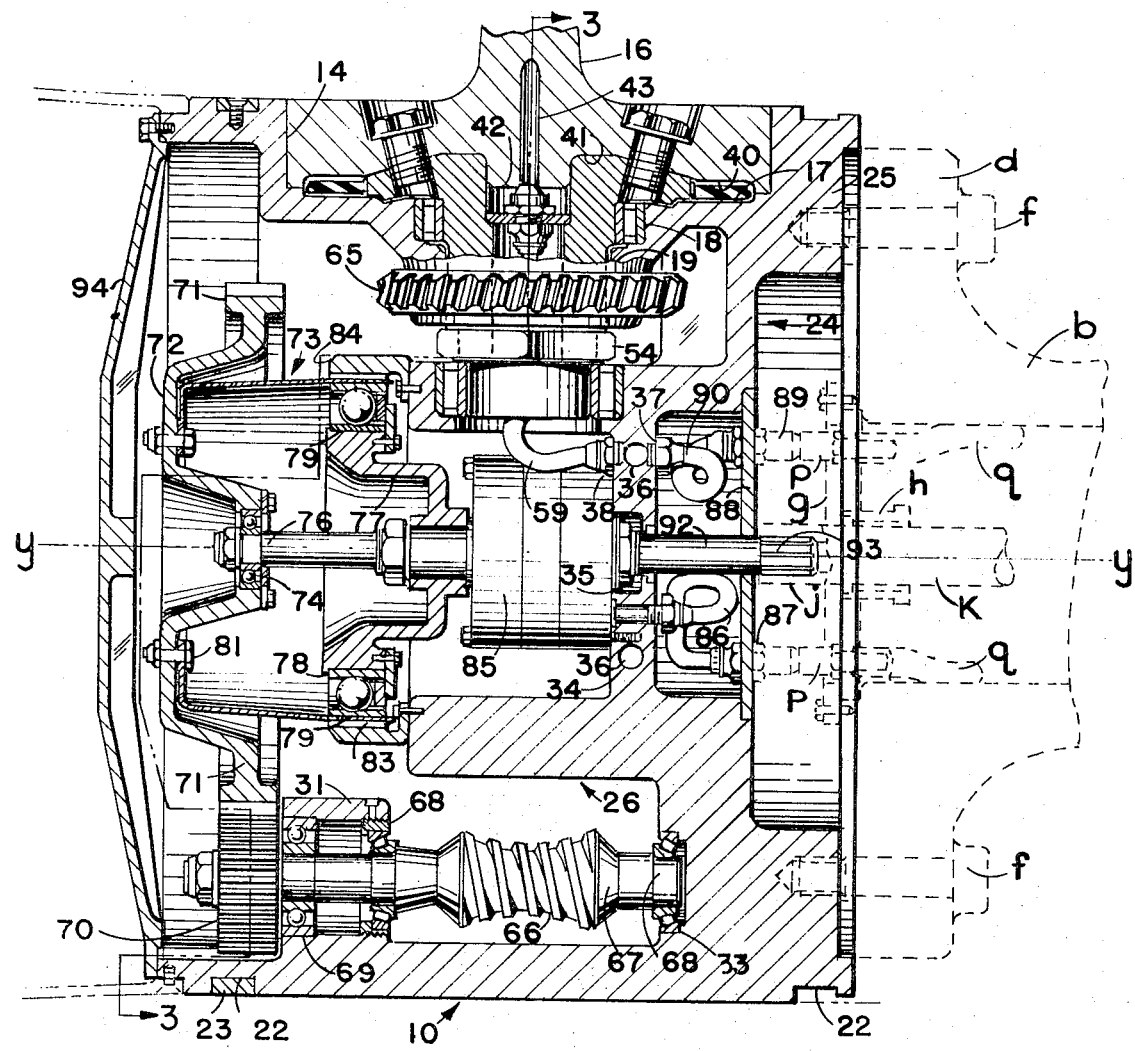
FIG. 1
INVENTORS
JOHN T. PARSONS AND
DONALD E. GOODLAND
BY
ATTORNEY

CONTROLLABLE PITCH MARIPROPELLER

BACKGROUND OF THE INVENTION

The desirability of controllable pitch marine propellers is widely recognized; yet heretofore only limited use has been made of them because of the size, weight and complexity of the mechanical elements needed to perform their functions. Controllable pitch hubs must be supported by the propeller shaft bearings; hence their weight, and the distance which they remove the blades from the bearings, may impose excessive loads on the propeller shafting. Unless the hub mechanism controls the blade pitch rigidly and precisely, unequal thrust forces will result, causing problems of control as well as increased wear. Accordingly, firm control should be accompanied by a minimum of weight and size.

Of various pitch controls, the type in most common use is a relatively large, heavy hub mechanism which changes the pitch of blades by forward and aft movement of a central horizontal shaft, which move control arms to rotate the blades about pitch control axes. Tolerances inherent in such mechanism permit an undesirable variation of blade angles.

SUMMARY OF THE INVENTION

Summarizing briefly and without limiting the scope of the invention herein described, I utilize an especially compact hub casing, preferably cast in one piece by utilizing a vaporizable polystyrene pattern assembled of several pattern parts to provide the many bearing pockets and other elements which will be described. The rounded outer wall of this hub casing has inward extending annular cup portions which have pockets to hold outer bearings for the blade spindles; and inward facing annular surfaces of the cup portions react the centrifugal thrust.

A second, inner set of blade spindle pockets are formed in a hollow center post, which extends aft along the hub centerline from a forward plate-like portion of the casting. Bearings in these pockets support the inner ends of the spindles; while bearings in the cup portions support their outer portions, to which the blade palms are bolted.

Control of the pitch angle of the spindles is effected through collars, outwardly of the inner bearings, which also apply the centrifugal thrust to the inward facing annular cup surfaces. Each collar bears a gear sector, which engages a worm gear of the Cone enveloping type, mounted on a shaft whose axis is parallel to the hub central axis. Each shaft is supported forwardly by a bearing in the forward plate-like portion of the casing, and aft by a bearing supported by an inward-extending aft flange.

Gears at the aft ends of the shafts are engaged by a centrally mounted bull gear, driven by a gear reducer of the harmonic drive type, mounted onto the aft end of the hollow center post portion of the casting. The hollow of the post contains a rotary motor which drives the harmonic drive; such motor is preferably powered by oil under pressure. Its axial shaft extends forward to a splined connection with an aligned control rod within the propeller shaft, for position sensing as well as emergency manual control.

BRIEF DESCRIPTION OF THE DRAWINGS

FIG. 1 is a sectional view, taken along a fore and aft vertical center plane, showing a controllable pitch hub embodying the present invention mounted on a propeller shaft, shown in phantom lines.

DESCRIPTION OF THE PREFERRED EMBODIMENT

A controllable pitch hub embodying the present invention is best shown in the sectional view FIG. 1. The phantom lines at the right side of the figure show a conventional hollow propeller shaft $b$ which terminates in a mounting flange $d$ to which the present hub is secured by a circle of bolts $f$. A disk-like closing plate $g$, bolted across the aft end of the hollow through the shaft $b$, contains a central bushing $h$. In it is mounted the aft, interiorly splined end $j$ of a central rod $k$, which extends forwardly through the hollow shaft $b$ and is utilized for pitch sensing and emergency manual control as hereinafter described. The plate $g$ also mounts quick disconnect terminal fittings $p$ for hoses $q$ which conduct air and oil under pressure through the hollow of the shaft. At the aft side of the hub mechanism, shown at the left of FIG. 1, is a conventional conical fairing $t$.

The hub of the present invention includes a compact casing generally designated 10. It includes a number of fairly complex elements, hereafter described; nevertheless it may be cast in one piece using a vaporizable pattern made up of polystyrene parts which the molten metal replaces as it vaporizes them. This technique has recently come into widespread use.

Figure 2:
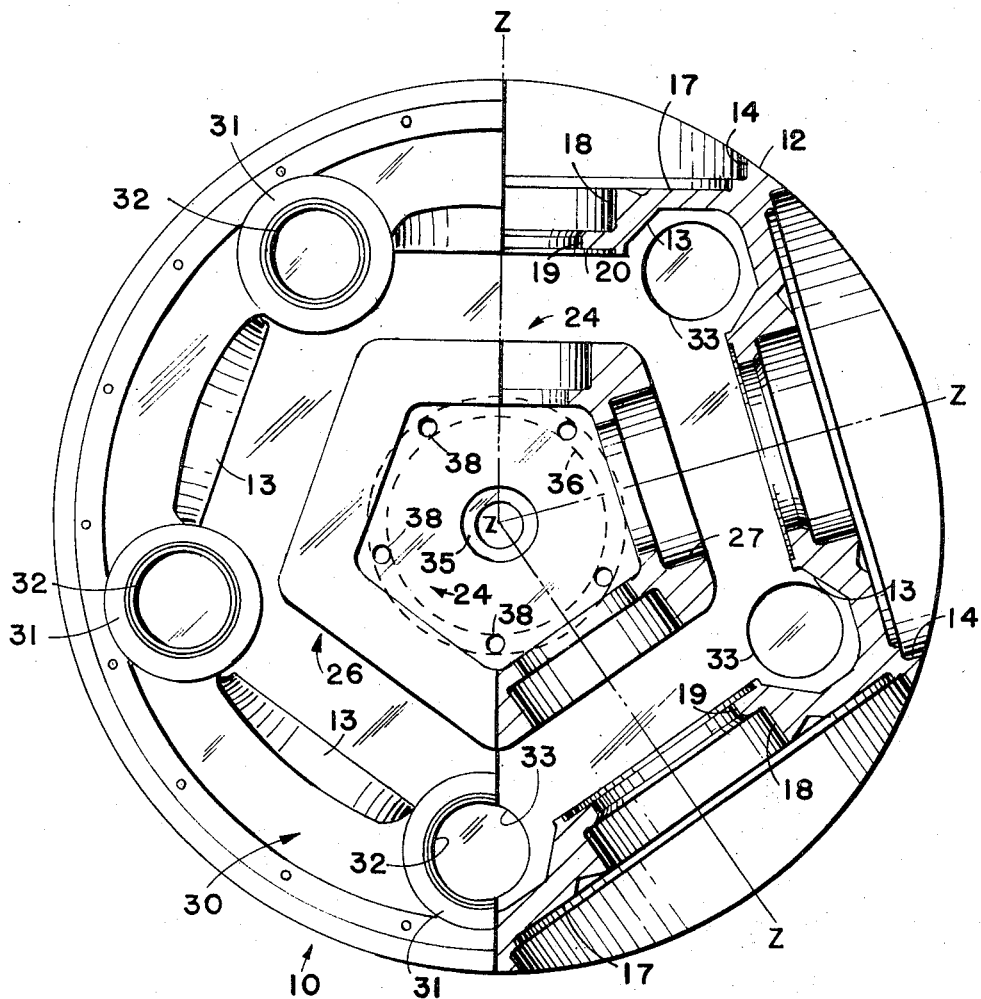
FIG. 2 is a view from the rear of the hub casing casting utilized, the portion to the right being a cross-section taken through the blade spindle bearing pockets of FIG. 1.

The casing 10 is a hollow hub casting, of substantially cylindrical or barrel shape, formed about a central axis $y$—$y$. Its rounded outer wall 12 is indented by cup portions 13. Each commences with a cylindrical wall portion 14 in which is received the palm 15 at the root 16 of a replaceable propeller blade, shown fragmentarily in FIG. 1. Inwardly of the cylindrical wall 14, the base of each cup portion 13 includes an annular seal retaining surface 17; inwardly of it is a bearing pocket 18 for a first or outer spindle bearing; and inwardly of the pocket 18 is a central cup opening 19, as seen in FIGS. 1 and 2. Inward-presented annular surfaces 20 about the central openings 19 of the cups 13 react the blade centrifugal thrust, as hereafter described. These elements of the casting 10 are machined to define radial pitch-change axes $z$—$z$ at equal angular spacings about the central axis $y$—$y$. In the illustrated embodiment, there are five cup portions 13, at spacings of 72°.

To provide for slinging, so that the assembled hub and blades may be mounted to the flange $d$ of the propeller shaft $b$, circumferential sling-receiving grooves 22 are provided in the outer wall 11 of the casing 10, spacedly inward and closely adjacent to its forward and aft edges. After mounting the casing, the grooves 22 are filled with the filler strips 23 mounted by screws as shown in FIG. 1.

At its forward end, the casing casting 10 has a forward plate-like portion generally designated 24, best shown in FIG. 1. Its radially outer thickened part 25 is tapped on its aft side to receive the mounting bolts *f*. Radially inwardly, but spaced well away from the central axis *y—y*, the plate-like portion 24 terminates in an integrally formed aft extending hollow center post portion generally designated 26. In the embodiment shown, this post portion 26 has five sides, perpendicular to the radial axes *z—z*. Each is bored, through the cup portion 13, outward of it, to provide a second, inner spindle bearing pocket 27 having an inner bottom opening 28.

At the aft side of the casing casting 10 is an inward extending aft flange portion generally designated 30, from which five bosses 31 extend farther inward. On its forward and aft sides, each boss 31 has a pair of bearing pockets 32 whose axes are parallel to the central axis *y—y*, spaced angularly around the central axis *y—y* and positioned between the inward extending cup portions 13 of the casting 10. In alignment with flange bearing pockets 32, forward bearing pockets 33 are provided in the thickened forward wall portion 25, as shown in FIG. 1 and at the right side of FIG. 2. These bearing pockets 33 are bored through, and in alignment with, the bearing pockets 32 in the aft flange 30.

Within the hollow of the center post portion 26, spaced a short distance aft of its forward side, is an integral divider wall 34 having a central countersunk bore 35 on the axis *y—y* and hollowed by an integrally cast annular air manifold passage 36. An air inlet into the passage 36 is drilled into the forward side of the divider wall 34, while on its aft side a plurality of air outlets 38 are drilled, one for each blade spindle to be described.

Figure 3:
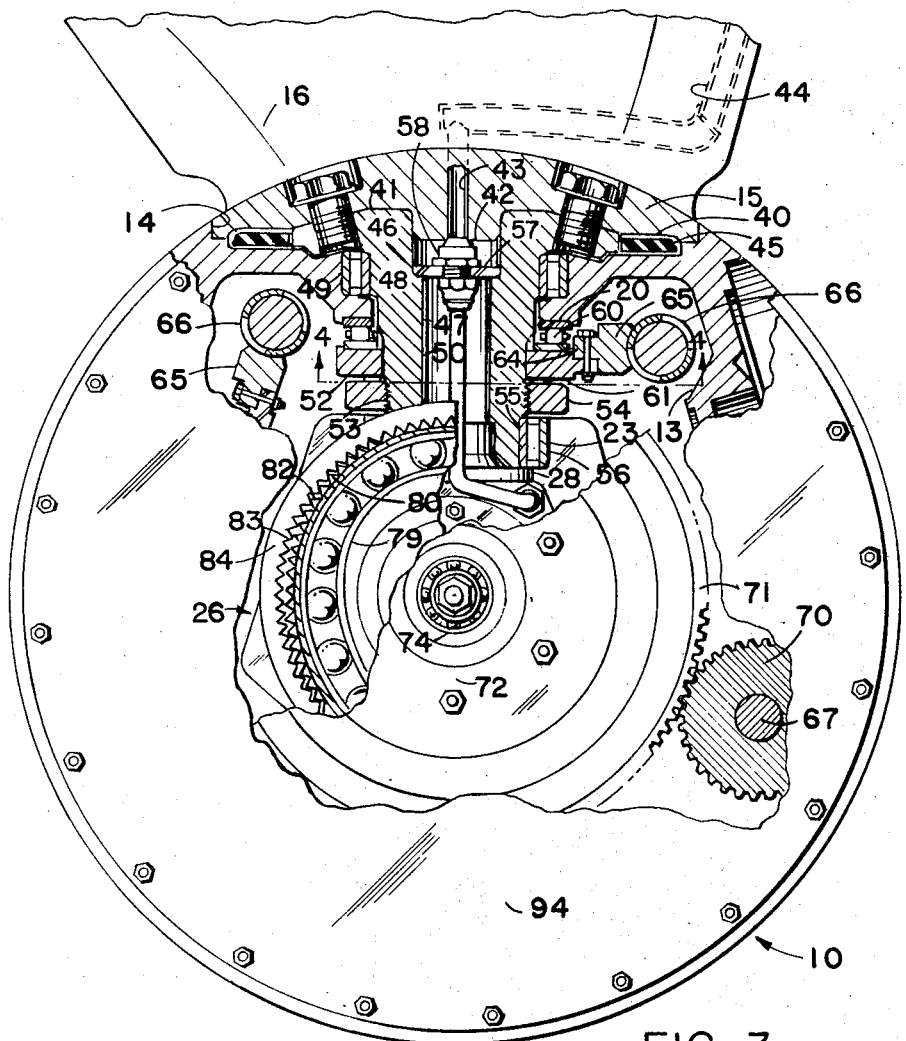
FIG. 3 is a rear view of the assembled mechanism of FIG. 1, partly in elevation and partly as broken away to the section line 3—3 of FIG. 1.

Replaceable propeller blades, whose root sections 16 are shown in FIGS. 1 and 3, conventionally have palms 15 of circular cross-section, rounded in depth to fair into the outer wall of the hub casing 10. Each palm undersurface includes an annularly outer, downward presented sealing face 40; an annularly inner tapered portion 41 which is bolted to the spindle to be described; and a central inward projecting locator portion 42. An axial bore 43 extends centrally through the locator portion 42 to connect through the blade root section 16 to a leading edge air passage 44. At its inner end the bore 43 has provisions for mating with a quick disconnect air fitting, hereafter described.

The space between the annular sealing face 40 of the palm and the corresponding cup surface 17 beneath it, is sealed by a rubber-like relatively flat annular seal 45, to exclude water from the bearings and the interior mechanism. Radially inward of the seal 45 in each cup 13 is the outer flange 46 of a blade spindle generally designated 47; the flange 46 is drilled and tapped to receive bolts which mount the blade palm 15. The spindle 47 is hollow; the outer part of its hollow receives the projecting locator portion 42 of the palm.

Radially inward of its flange 46 the outer surface of spindle 47 has a first bearing shoulder 48; about it is mounted a first or outer spindle bearing 49 which rests in the first bearing pocket 18 of the casing cup portion 13. The spindle 46 continues inwardly in a hollow shank portion 50, a part of which has keyed grooves 51 on which a collar 52 is mounted, as hereafter described. Radially inward of the portion so grooved, the spindle shank has exterior threads 53 on which a nut 54 is mounted. As shown at the right side of FIG. 3, the shank portion 50 terminates in a second, inner bearing shoulder 55 on which a second inner spindle bearing 56 is mounted, received within the inner spindle bearing pocket 27. Thus, blade bending is resisted by the spaced-apart outer and inner bearings 48, 56 in the cup portion 13 and post portion 26 respectively.

Near the outer end of the hollow of the spindle 47, spacedly inward of the locator portion of the blade palm, is a disk mount 57 for an air fitting 58 of the quick disconnect type, which has a conventional connection to the blade portion 15 and opens to the blade leading air passage 44 when the blade palm 15 is mounted onto the spindle 47. An air tube 59 connects from the air fitting 58 to one of the manifold air outlets 38, as shown in FIGS. 1 and 3.

On the upper surface of the collar rests a centrifugal thrust bearing 50 which bears against the annular inner surface 20 of the cup portion 13 of the casting 10. Centrifugal force, exerted by a rotating propeller blade on its spindle 47, is carried through the nut 54, a spacer 61 thereon, and then through the collar 52 and thrust bearing to be reacted by the cup portion inner surface 20.

Figure 4:
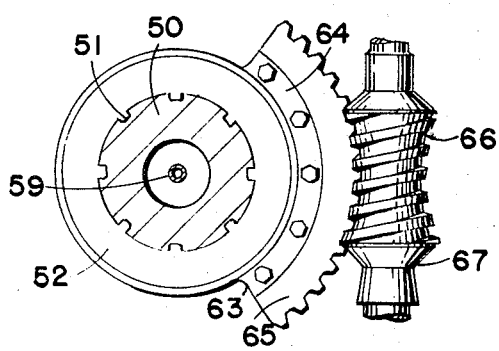
FIG. 4 is a fragmentary view taken along line 4—4 of FIG. 3.

Pitch control is achieved as follows: around a portion of the circumference of the collar 52 is an integral radially-projecting lug 63. Mounted on the lug 63 by bolts, as shown in FIG. 4, is the inner flange 64 of a sector gear 65, which meshes with a worm gear 66. They make up a worm gear set of the Cone enveloping type. As seen in FIG. 4, this type of gear set provides meshing contact over a full 45° angle, so that loads and wear are minimized; this eliminates the play which is present in pitch change mechanisms utilizing link arms. The worm gear 66 is mounted on a fore and aft shaft 67 whose forward end, as seen in FIG. 1, is supported by a bearing 68 in the forward bearing pocket 33. The aft end of the shaft 67 passes through a flange boss 31 and is there supported by a tapered roller bearing 68 and a ball bearing 69 in the pair of pockets 32 respectively fore and aft of the boss 31. Aft of the bearing 69, a spur gear 70 is mounted on the shaft 67.

Control over the several spur gears 70 is exerted through a large-diameter bull gear 71 whose middle portion 72 serves as the aft side of a gear reducer of the harmonic drive type generally designated 73. At its center, the bull gear 71 is supported by a bearing 74 on the gear reducer central shaft 76 which is concentric with the axis *y—y*. Secured to the shaft 76 forwardly of the bull gear 71 is an elliptical driving member 77. Its radially outer periphery 78 rotates against a ball-containing flexible cage 79 which fills the forward end of a flexible drive casing 80 whose relaxed form would be a hollow cylinder, but whose flexibility permits it to distort to elliptical shape. The casing 80 is secured at its aft end by a circle of bolts 81 to the central portion 72 of the bull gear 71. On the outer surface of its forward end the flexible casing 80 has external teeth 82. As the elliptical driving member 77 rotates and progressively distends the cage 79 and casing 80, its external teeth 82 are driven outward to engage the inwardly presented teeth 83 of a surrounding stationary ring gear 84, mounted by screws to the aft surface of the casting center post 26. Since there are fewer teeth 82 on the casing 80, it will be slowly driven angularly.

The central shaft 76 of the gear reducer is the aft continuation of the shaft of a rotary hydraulic motor 85, mounted within the hollow of the center post 26 to the aft side of the divider wall 34. The motor 85 is powered by fluid supplied through a pair of oil tubes 86 extending through the divider wall 34, which connect to disconnect fittings 87, mounted on a plate 88 fitted across the forward end of the hollow of the post 26. A similar disconnect fitting 89 for air under pressure is also mounted on the plate 88, connected by an air tube 90 to the air inlet 37 of the manifold passage 36.

When oil is forced through the motor 85, its shaft 76 rotates the elliptical driving member 77 relatively rapidly, causing the casing 80 to rotate relatively slowly, and to thus turn the bull gear 71. Such a conventional harmonic drive effects a great reduction of angular motion as between the motor 85 and the spur gears 70 mounted on the ends of the parallel shafts 67. Each of these drives an enveloping worm gear 66, which moves a sector gear 65 at an even lower angular rate, with increased torque and substantial irreversibility. Accordingly, the motor 85 exerts very precise control over small variations in angular position of the blade spindles 47.

The forward end 91 of the motor shaft 76 has external splines 93 fitted axially into the end of the rod $k$ which passes through the hollow of the propeller shaft $b$. Conventional electric or electronic apparatus counts the rotation of the rod $k$ to sense with accuracy the angular positions of the blade spindles 47. Further, should there be any failure of the rotary motor 85, the rod $k$ may be rotated from its forward end to drive the motor shaft 76 in either direction, as an emergency procedure to control the propeller blade pitch angle.

The compactness of the casing 10, which minimizes the distance from flange $d$ to the radial axis $z-z$ of the spindles 47, lessens the bending moment which the propeller exerts on the shaft $b$, and the effects of any unbalance. The worm gear shaft axes 67 are positioned, as shown in FIG. 3, angularly between the cup portions 13; and the sector gears 65 are engared farther outward, radially from the central axis $y-y$, than the centrifugal thrust receiving surfaces 20 of the cup portions 13. This outward positioning maximizes the rigidity with which pitch angles are controlled. Mounting the control motor 85 within the hollow of the casting post portion 26 to which the harmonic drive gear reducer assembly is also mounted, greatly simplifies assembly and inspection of the mechanism, which may be checked as a whole before being closed by an aft closure plate 94 mounted as shown in FIG. 1.

Conventional accessory items, such as those to fill the casing 10 with oil, are not shown. Likewise not shown is the conventional electronic apparatus to be attached to the forward end of the rod $k$ to count revolutions of the motor 85 and thus sense electronically the blade angularity. The selection and utilization of these features, as well as conventional alternatives to the features shown and described, will be apparent to persons skilled in the art.

We claim:

1. A pitch change hub for a marine propeller, comprising
   a hollow structural casing having a rounded outer wall and a central axis, and having integrally formed therein a forward mounting plate portion and a hollow post portion extending aft therefrom along said axis spacedly inward of said outer wall, first bearing means mounted in the wall of said casing on spindle axes extending outward substantially radially from said central axis,
   second bearing means on said axes mounted in said hollow post portion,
   blade spindles supported by said first and second bearing means,
   gear means mounted on and rotatable with each spindle positioned between said first and second bearing means,
   worm gear means, rotatable on axes parallel to said central axis and extending spacedly adjacent to each said spindle axis, to engage said spindle-mounted gear means,
   control motor means within the hollow post portion having an output shaft on said central axis, and
   gear reducer means, of the type having a central input, a peripheral output, and a mounting provision spaced therebetween, mounted on the end of said hollow post portion aft of said second bearing means, coupling all said worm gear means to said control means on the central axis.

2. A pitch change hub as defined in claim 1, wherein the gear reducer means is of the harmonic drive type.

3. A pitch change hub as defined in claim 1, wherein the casing has palm-receiving cup portions, extending inwardly from the rounded outer wall in which said first bearing means are mounted, and wherein the said gear means rotatable with said spindles are positioned inwardly of and adjacent to said palm-receiving cup portions,
   whereby centrifugal thrust is resisted by the inward-facing surface of each cup portion, and wherein
   the axes of said worm gear means are radially outward from the central axis farther than said annular inward-facing surface,
   whereby to accommodate the defined mechanism compactly within the casing.

* * * * *